Nov. 28, 1967     A. J. PRESTIGIACOMO     3,355,551
ANALYSIS AND REPRESENTATION OF COMPLEX WAVES Filed June 5, 1964     4 Sheets-Sheet 1

FIG. 1

INVENTOR
A. J. PRESTIGIACOMO
BY G. E. Hirsch Jr.
ATTORNEY

3,355,551
ANALYSIS AND REPRESENTATION OF
COMPLEX WAVES
Anthony J. Prestigiacomo, North Plainfield, N.J., assignor to Bell Telephone Laboratories, Incorporated, New York, N.Y., a corporation of New York
Filed June 5, 1964, Ser. No. 372,955
7 Claims. (Cl. 179—1)

This invention relates to the analysis of complex signals into their several harmonic components and to the display of the resulting spectrum for visual examination. It is thus concerned with the class of devices known as spectrum analyzers and has for its principal object the improvement of such devices in terms of speed, ease of operation, precision, and flexibility.

Spectrum analyzers, or "spectrographs" as they have come to be termed, are widely used to produce permanent visual records which show the distribution of energy of a sound in both time and frequency. They are used to produce records, commonly called "spectrograms," of several different sorts, for example, records which relate to frequency, amplitude, and time in various combinations, and are used to analyze a wide variety of message signals. Spectrum analyzers are thus useful in the study of speech and other sounds and for providing records of sounds from different speakers or sources so that later classification and identification of them may be made.

Typically a sound spectrograph employs a magnetic transducer for repeatedly converting a recorded sample of a message wave into an electrical signal equivalent, and an analyzer responsive to the repeated signals. The analyzer generally employs the combination of a filter of specified bandwidth, a heterodyne oscillator which is made to sweep over a specific range of frequencies, and a modulator. Modulation side frequencies produced by the heterodyne operation pass through the filter in succession. Such a succession of signals represents the amplitude spectrum of the signal in different, contiguous, narrow frequency bands, and may be used to cause a facsimile record to be marked as a function of amplitude and frequency during the scanning intervals. The usual spectrogram is thus produced. Alternatively, either a so-called amplitude cross-section representation may be made in which the several frequencies at a single instant of time of the message signal are displayed by a series of lines whose lengths represent the magnitudes of selected frequencies, or a so-called contour spectrogram may be prepared in which signal amplitudes are restricted to a limited number of amplitudes.

The analysis and display of message data of this sort preferably should be accomplished with sufficient precision that subleties in the frequency and amplitude characteristics of different message samples are readily apparent, and at a sufficiently high speed that the result of each analysis is immediately available for visual examination. Further, the apparatus should accommodate relatively long message samples. Finally, operation should be simple enough that a moderately skilled operator may be assured of consistent and reliable results.

It is a specific object of this invention, therefore, to improve the operation of sound spectrograph apparatus so that spectrograms of uniform high quality may be made at a relatively high speed.

It is another object of the present invention to improve the operation of sound spectrograph apparatus by placing as many operations as possible under automatic control.

It is yet another object of the invention to simplify the apparatus required to develop high resolution spectrograms of contiguous segments of relatively long sound signals.

The improvements of the present invention touch on a number of the essential operations of a sound spectrograph and together permit each to function in an optimum fashion. Conveniently, a drum arrangement is used for repeatedly scanning a selected message. In the usual manner, a section of a permanent record, e.g., a section of magnetic tape bearing the message wave, is placed around the periphery of a drum and repeatedly scanned by a transducer rotating axially within the drum. For each scan, a different narrow band of frequencies of the signal sample is selected for analysis by virtue of the stepped frequency characteristic of a heterodyne analyzer. In essence, a narrow frequency band only of the entire signal is selected for analysis during each successive scan. The selected signal is processed, for example, by selecting discrete frequency bands, by sampling at prescribed times within each scan to establish a measure of signal amplitude, or by limiting the signal to one of a number of discrete levels, i.e., by quantizing it. The signal is then suitably amplified and supplied to a marking stylus which traces a helical path on voltage sensitive paper placed on a cylinder. The cylinder, which is maintained at a reference or ground potential with respect to the potential of the marking signal, is made to rotate in synchronism with the scanning transducer in the drum. Voltage variations at the stylus output thus produce marks on the paper. The position of marks along one dimension denotes time, the position along another dimension denotes frequency, and the degree of marking intensity is proportional to relative signal amplitude.

In the present invention, repeated playback, or "scanning" of a sound record takes place at a relatively high speed so that the message is effectively time compressed and frequency expanded. This permits the subsequent analysis to take place at a correspondingly higher speed. As the speed of playback is increased, however, difficulties are encountered in holding the magnetic tape tightly to the playback drum. At high rotational speeds of the pickup transducer, the tape is occasionally pushed away from the drum. Poor tape-to-head contact results and reproduction suffers. This difficulty is overcome in the present invention by positively securing the magnetic tape record to the drum during the entire scanning operation. In operation, the desired segment of a recorded sound, generally selected from a long message tape, is positioned on the active scanning area of the drum, the tape is locked in place to isolate it from stresses and variations external to the drum, and finally, a prescribed interval later, sufficient tension is applied to the tape surrounding the drum to insure intimate contact with the scanning head during the scanning that follows.

To provide spectrograms of a reasonable size, and to avoid the necessity of an unwieldy recording cylinder, it is conventional to limit the diameter of the cylinder to approximately three or four inches. With approximately five repetitions of the sound per second, the cylinder is capable of supporting a reproduction encompassing approximately two and one-half seconds of message. Longer message samples are analyzed by piecing together successive and contiguous message intervals. This requires that the facsimile paper on the recording cylinder be replaced periodically, following each analysis. It is conventional to advance the tape on the playback drum for the next sound segment by means of a mechanical arrangement which approximates the scanning interval of the tape but nevertheless requires a final manual "cuing" of the tape to assure continuity.

According to the present invention, precise automatic tape advance is achieved by a timing circuit which is initially adjusted to the exact readout interval of the playback drum arrangement. In its simplest form, an electrical timing circuit, such as a mutivibrator, is employed with a time-constant adjusted to the active playback interval. When triggered, the multivibrator produces a continuous energizing signal for advancing the tape about the drum. During the advance period, the clamp and tension means are released. At the end of the advance period, the tape is once again clamped and retensioned precisely on the drum. Consecutive segments of the message wave are thus automatically selected and positioned, contiguity is assured, and the necessity of manual cuing is completely eliminated.

Another feature of the present invention overcomes the difficulty in obtaining spectrograms of consistent quality, i.e., marks of equal intensity for equal signal amplitudes. Marking nonuniformity occurs typically because the burning operation which produces the record is destructive of the writing stylus. Further, the quality of the reproduction is dependent on the precise positioning and pressure of the stylus on the facsimile paper surrounding the recording cylinder. As the stylus wears, it must be periodically advanced toward the facsimile paper. This may be done either manually or with a spring arrangement. In either case, however, manual dexterity and experience is required to produce the optimum pressure for consistency in reproduction. According to the present invention, tensioning means are employed which assure that the spring constant is essentially uniform at optimum marking pressure over the relatively long wearing length of the stylus.

Usefulness of a spectrograph is enhanced by providing calibration marks on the spectrogram which indicate amplitude, time or frequency. This is generally accomplished by supplying calibrating signals of one sort or another to the stylus during the reproduction. Preparation of these signals is generally automatic, but nevertheless generally requires a number of individual circuits, e.g., crystal calibrators for frequency, logarithmic circuits for converting linearly developed marking signals to a db scale for amplitude indications, and counting circuits for providing timing information. According to the invention, the development of calibrating marks is greatly simplified by applying calibration pulses to the filter channel before heterodyne scanning. Accordingly, as scanning takes place, the correct harmonic of the calibration signal only is passed through the processing equipment, and the appropriate calibration mark is assured for the corresponding signal.

The invention will be fully apprehended from the following detailed description of a preferred embodiment thereof taken in connection with the appended drawings, in which.

Figure 1:
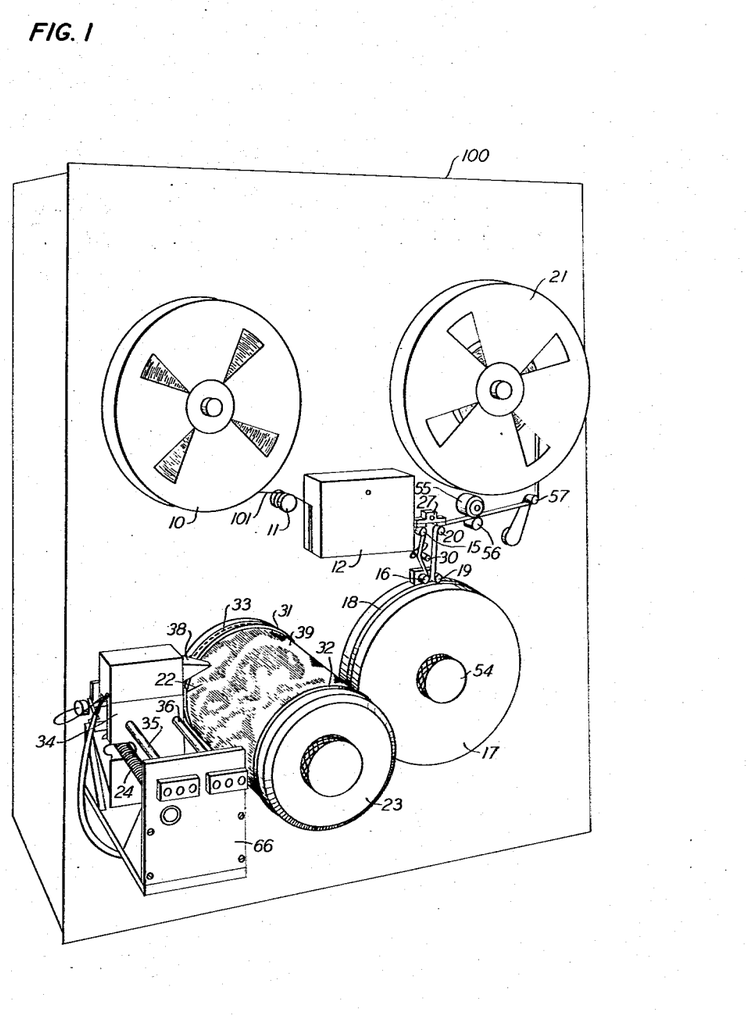
FIG. 1 is a diagrammatic representation of a sound spectrograph which employs the several features of the invention.

An improved spectrum analyzer which incorporates the features of the present invention is shown, in one convenient arrangement, in FIG. 1. As illustrated, the several elements are compactly arranged and secured to panel 100 so that the entire unit may be mounted in a relay rack. It is to be understood, of course, that various other physical arrangements of the elements may be used. For example, the elements may be arranged for mounting in a portable case or the like.

Figure 2:
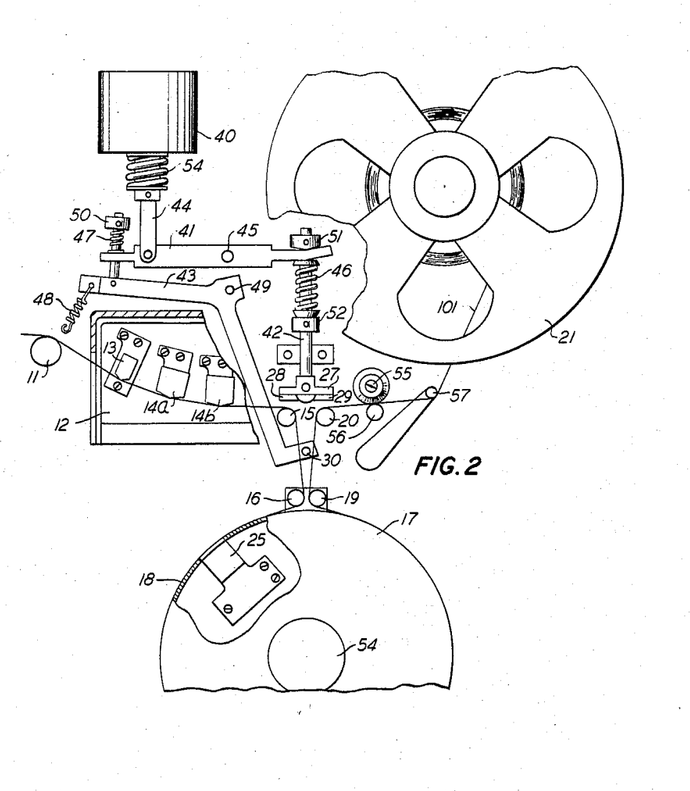
FIG. 2 is a somewhat simplified representation of the clamp and tension feature of the invention.

To afford the greatest possible operating convenience, provision is made for accommodating standard spools of magnetic tape. Supply spool 10 delivers tape 101 by way of idler 11, a number of magnetic transducers, e.g., erase, record, and playback heads within cover 12, and idlers 15 and 16 to drum 17. The arrangement of magnetic transducers within cover 12, best viewed in FIG. 2, is provided merely as a convenience so that relatively long recordings may be prepared or monitored as an adjunct to the preparation of a spectrogram; it serves the function of a conventional tape record-playback system but, by itself, forms no part of the present invention. Drum 17 is provided with a peripheral track 18 which permits tape 101 to travel around the drum and, by way of idlers 19, 20, and 26 to take-up spool 21. Track 18 is slightly recessed and shaped to accommodate the tape loop. This aids in assuring a tight fit of the tape to the drum. By means of the monitoring head within housing 12, recorded material supplied from spool 10 to spool 21 may be examined for portions suitable for analysis.

Figure 4:
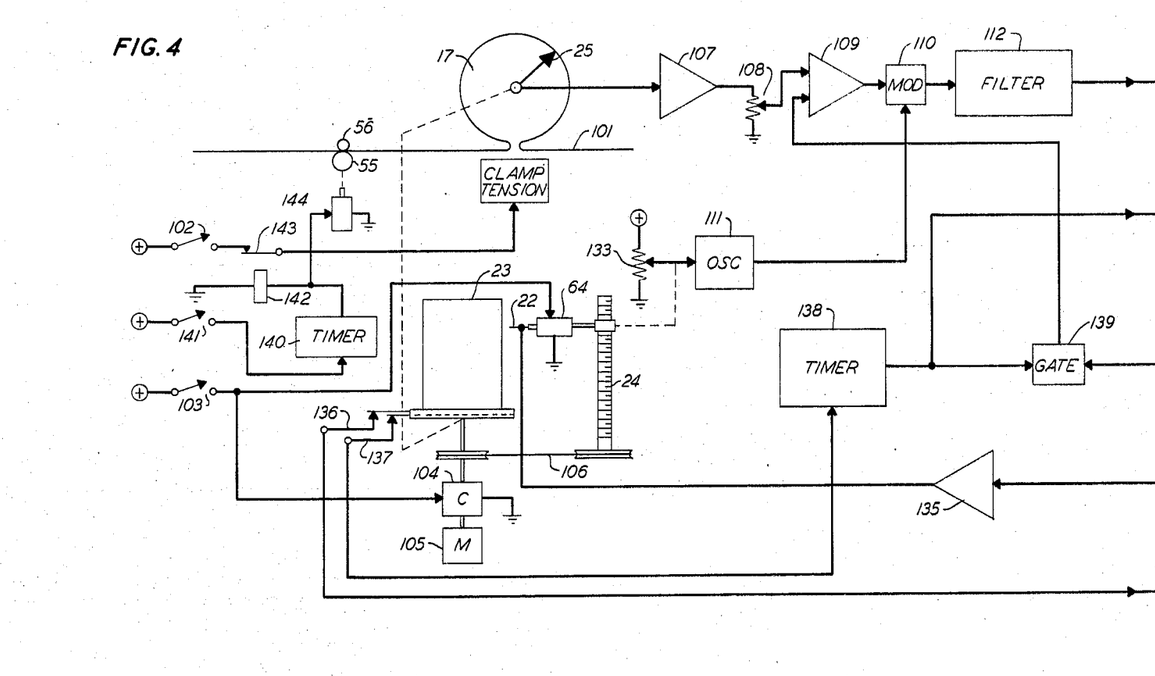
FIGS. 4 and 5, assembled as shown in FIG. 6, are block schematic circuit diagrams illustrating the electrical interconnections of the various elements used in implementing the invention.
Figures 5, 6:
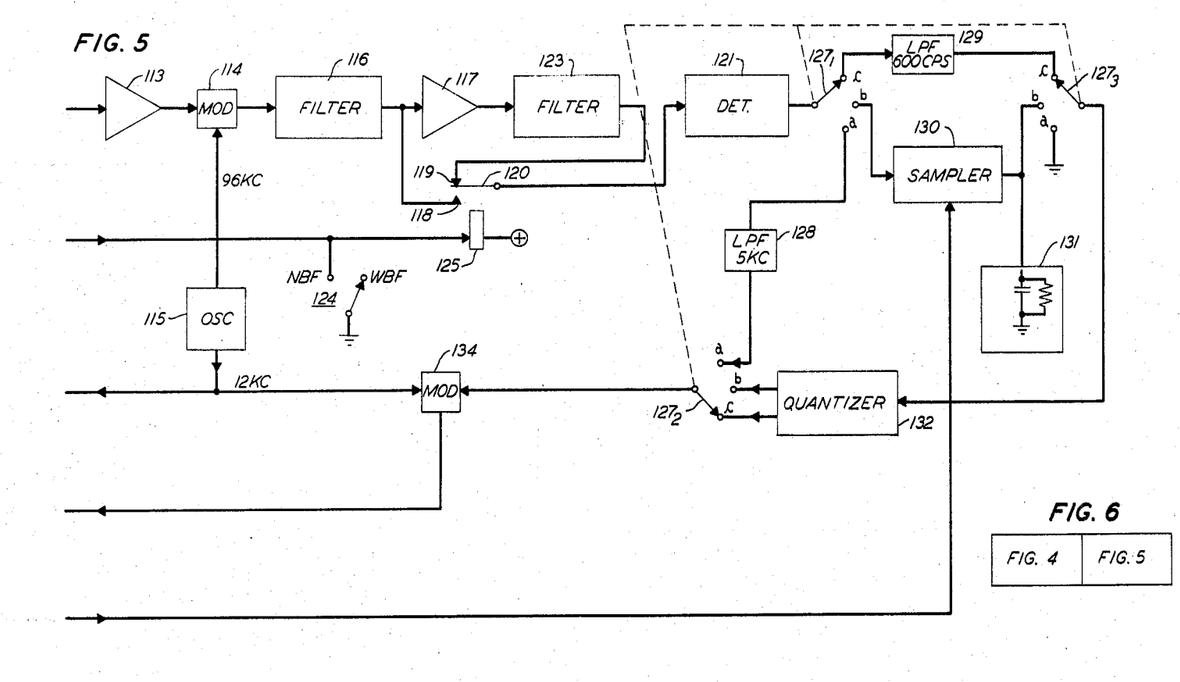

When such a portion is encountered, transportation of the tape by way of the system of idlers and drum 17 is stopped and the desired portion of the tape is positioned about drum 17. Preferably, a system of electrical braking, of any desired sort well known in the art, is used to stop the spool drive and take-up motors. A clutch mechanism may be provided so that in the stopped condition the tape may be rocked back and forth by hand to position the desired portion of the tape about the drum. Drum 17 is provided with a movable platform or arm which supports magnetic pick-up head 25, visible in the cutaway view of FIG. 2. Head 25 is accordingly made to travel around the interior periphery of drum 17 so that the material recorded on that portion of the tape positioned on the drum is repeatedly reproduced. In conventional fashion, the repeated renditions of the recorded tape are supplied to processing apparatus which prepares the signals for visual display. These circuit elements are physically placed in any convenient location. Their individual configurations and interconnections are shown in FIGS. 4 and 5. As contiguous segments of the sound sample are processed, signals representative of the amplitude of specified frequency components of the signal are delivered to the marking stylus.

As scanning progresses, the frequency of the segment processed is shifted through the desired range and stylus 22 is caused to travel correspondingly along the length of metallic cylinder 23. Cylinder 23 is mounted for rotation about an axis that is parallel to the direction of travel of the stylus, and carries a sheet of recording paper wrapped about its surface. Typically, the stylus potential is well above that of the metallic cylinder, so that the potential difference between the two gives rise to a burning of the paper wrapped around the cylinder. One of the class of voltage sensitive papers known as "Teledeltos" is satisfactory. Marks of various intensities are made on the paper for each frequency segment, and marking progresses from one end of the cylinder to the other as a function of frequency. Stylus 22 is carried along by means of a lead screw 24 and a follower 37 (FIG. 3) operating synchronously with cylinder 23. If desired, provision may be made for exhausting smoke which is produced as the stylus burns the paper. Chimney 38 is indicated for this purpose. The resulting display depicts amplitude versus frequency versus time of the message captive on drum 17.

In order to accelerate the production of a sound spectrogram it is, of course, desirable that scanning take place at a relatively high rate. This may be readily accomplished by rotating the pick-up head 25 at a high speed. Conventional means, such as a slip ring or the like, are used for delivering signals developed by pick-up head 25 to the processing apparatus. However, it has been found that at high rotational speeds, sufficient pressure is developed between head 25 and the tape portion captured in track 18 to prevent a close adherence of the tape to the head. This results in poor frequency response, flutter, and generally poor reproduction. This condition can be mitigated to some extent by back-braking spools 10 and 21 and using spring loaded idlers or the like to maintain a generally taut condition of the tape in its path between spools 10 and 21. However, even these usual precautions do not suffice at advanced speeds.

It is in accordance with the present invention to assure good tape-to-head contact by means of auxiliary clamp members 27 (FIGS. 1 and 2) mounted in proximity to idlers 15 and 20. Clamp 27 is provided with two individual resilient clamping elements 28 and 29, and is actuated by means of a mechanism (shown in detail in FIG. 2) which urges it downward against the tape and idlers 15 and 20 at the moment that tape motion from spool 10 to spool 21 is stopped. With sufficient pressure, elements 28 and 29, which may conveniently be sponge-like pads, effectively isolate the portions of the tape extending from idler 15 via drum 17 to idler 20. Such isolation, although an aid in maintaining the requisite tension about the scanning drum, is not by itself enough. Accordingly, another feature of the invention is the use of a tensioning idler 30 positioned between idlers 15 and 16 and actuated in conjunction with tape clamp 27. After clamp 27 has locked the loop of tape about drum 17 and isolated it from the exterior tape paths, tensioning idler 30 is urged outward against the tape to draw it into a taut arc. Sufficient force is applied to insure that the captive tape loop is tightly bonded to scanning track 18.

In essence, a two-step operation takes place, namely, (1) tape traveling from spool 10 via drum 17 to spool 21 is stopped with the desired portion captive on drum 17. (Pick-up head 25 within the drum may be used as an additional monitoring head for this operation); (2) as soon as tape motion is stopped, clamp 27 locks the tape to the drum to isolate it from the rest of the system; and, finally, (3) tensioning idler 30 moves against the locked tape to hold the loop tightly about drum 17. It is to be noted that with the clamping operation, idler 30 continuously applies tension to the loop to keep it in a tight condition throughout the scanning operation. It has been found that with this clamp-tensioning action, there is no occasion for the loop to bulge or pull away from the drum even during relatively high speed scanning.

The three-step sequence of operations can best be observed by reference first to FIG. 2 which shows the clamp tensional assembly before it is actuated and then to FIG. 1 which shows the result of the clamping action. Initially, solenoid 40 is in the unenergized state so that clamp-tensional link 41, clamp shaft 42, and tensioning link 43 are in the positions shown. When actuated, solenoid 40 draws up plunger 44 to rock link 41 about pivot 45 and urges shaft 42 downward (in this view) against the restoring force of spring 46. Spring 46 is positioned by means of movable collars 51 and 52. Clamp member 27, attached to the end of shaft 42, is thus forced against idlers 15 and 20 to isolate that portion of the tape about drum 17 from the supply and take-up spools. At the moment clamping action begins, link 41 contacts tensioning spring 47 and pulls tensioning link 43 against return spring 48. Link 43 then rotates about pivot 49 and urges idler 30, attached at the lower extremity of link 43 and extending generally perpendicular to the link (outward from the drawing), against the loop of tape captured between idlers 15 and 16. The end result of these operations can be observed in FIG. 1. Tensioning force and the time delay between the application of clamp member 27 to idlers 15 and 20 and the movement of idler 30 against the tape is controlled by the constant of spring 47 and the positioning of tensioning collar 50. It is to be noted that the combined operation of clamping and delayed tensioning is obtained by an arrangement actuated by a single solenoid.

Although the diameter of drum 17 (FIG. 1) may be any convenient size and hence the captive loop of tape at its circumference can be made arbitrarily long, experience has shown that a drum on the order of six to eight inches is most convenient in use. This means that an active loop of approximately twenty inches is available for scanning. For recordings made at the usual 7.5 inches per second, it is apparent that approximately two and one-half seconds of material only may be analyzed at any one time. If longer record portions are to be accommodated with a drum of this size, a first selection of material is analyzed, the tape is then advanced twenty inches, and the next interval is analyzed. Typically, the advance of the tape from one contiguous segment to the next is done by hand while monitoring the recorded material by means of playback head 25. It is best for the head to be stopped in a position near idler 19 for this operation. Obviously, manual tape advance of this sort is time consuming and the accurate selection of the next, contiguous segment of tape depends in large measure on the skill of the operator. With clear-cut segmentation of words or syllables, a skilled operator encounters no appreciable trouble. However, with long utterances which lack convenient points of segmentation, the problem becomes acute.

It is in accordance with the present invention to overcome this difficulty by the provision of fully automatic tape advance by which contiguous segments of tape may be presented to the drum for analysis. Considering the sequence of operation by which this feature of the invention is turned to account, as soon as one spectrogram has been prepared, a signal supplied from a control circuit (141 in FIG. 4, described hereinbelow), initiates a sequence of operation. Solenoid 40 is first de-energized so that tension idler 30 is first withdrawn from the tape and then clamp 27 is released. Subsequently, under control of a timing circuit, tape is advanced from supply spool 10 to supply spool 21 for a prescribed interval, e.g., an interval that will advance the tape twenty inches or, in a typical example from practice, for 2.3 seconds of recorded material. Tape advance is accomplished, in practice, by actuating a solenoid or the like (144 in FIG. 4) under control of the timing network to urge idler 55 (FIGS. 1 and 2) against motor driven capstan 56 which continuously operates. Tape 101 thus advances past cut-off idler 57 to take-up spool 21. Its advance is stopped at the end of the timed interval, idler 55 is withdrawn, the take-up spool is stopped and solenoid 40 is again energized. Clamp 27 is thus once again applied to idlers 15 and 20 and tension idler 30 is reapplied to the loop between idlers 15 and 16 to draw the captive loop tightly about drum 17. The circuit by which these operations are carried out is discussed below with regard to FIG. 4. Analysis of the next consecutive portion may thus begin with the assurance that an exact match between contiguous tape portions has been achieved. It will be apparent that as the size of the drum is varied, in various spectrographs utilizing this feature, the timed advance is adjusted to match the active scanning circumference of the drum.

In the arrangement illustrated in FIG. 1, spectrograph recording cylinder 23 is shown mounted conveniently to one side of playback drum 17. If desired, it may of course be mounted on drive shaft 54 which carries pick-up head 25 within drum 17, either in front of or coaxially about it. It is the more usual arrangement to assure synchronization through such mechanical coupling. It has been found to be expedient, however, to divorce the recording drum physically from the playback drum and to couple the two by means of gears, belts, or solely through the action of synchronized motors. Those skilled in the art will understand that so long as the drum and cylinder operate in synchronism, with any desired ratio of relative speeds of rotation, any suitable arrangement for driving them is satisfactory.

Conveniently, recording paper 39 is secured to the surface of cylinder 23 by means of springs 31 and 32 at opposite ends of the cylinder. Further, the cylinder may be provided, preferably at the end nearest panel 100, with one or more rows of circumferential holes 33 which may support pins or the like which engage switch members, affixed to panel 100, during each revolution. The switches may be arranged to initiate appropriate action, e.g., marking, to be described hereinafter.

Stylus 22, which is energized by signals derived from pick-up head 25, after processing, is supported on a movable deck 34 (FIGS. 1 and 3) which is driven by lead screw 24 and follower 37. It travels on parallel support rods 35 and 36. As lead screw 24 is rotated in synchronism with the rotation of drum 17 and cylinder 23, the stylus support traverses the surface of cylinder 23 in a direction parallel to its axis. In order to generate the usual form of spectrogram, it is necessary that the pitch of lead screw 24 be selected to advance the stylus one discernible marking interval for each successive rotation of pick-up head 25 in drum 17. Convention largely dictates the pitch required.

Clean marking of the spectrogram paper is assured by positioning the stylus to engage the paper in a plane substantially parallel to the axis of cylinder 23 which intersects the cylinder at a point just above the axis. It has been found that the diameter of the stylus wire and the amount of force with which it bears on the paper surface affects both the resolution and gray scale. Accordingly, a stylus formed of steel "music" wire, with a nominal 0.013 inch diameter is quite satisfactory. Further, it has been found that a pressure of about twelve grams, plus or minus two grams, yields the most satisfactory reproductions. Experience has shown that the stylus must maintain a relatively constant pressure against the paper to achieve proper marking. Heretofore, it has been the practice to place the stylus in proximity to the paper and to adjust the engaging force by hand, i.e., with no means of determining the pressure but under sole control of the operator. A skilled operator could, of course, secure satisfactory results; the unskilled encountered difficulty and was forced to proceed on a trial and error basis. Further, as the stylus point wore down during burning, the pressure gradually decreased until it finally lost contact entirely. Readjustment by hand was frequently required.

Figure 3:
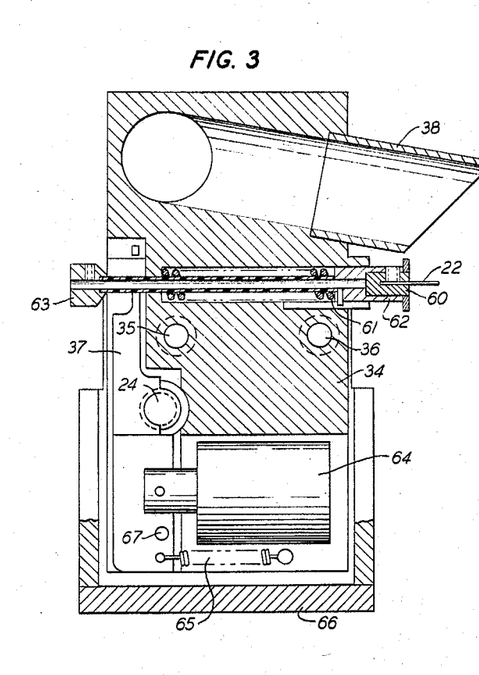
FIG. 3 is a simplified representation of the improved stylus support mechanism employed in the practice of the invention.

In accordance with the present invention, the engagement of the stylus with the paper on cylinder 23 is completely automatic. Provision is made for maintaining the optimum stylus pressure for prolonged periods of wear. As a consequence, operator attention is required only infrequently. In accordance with the invention, stylus 22 is carried by spring loaded plunger 60 which in turn is supported by holder 62. Spring 61, which urges the stylus plunger forward, is selected to have a spring constant of approximately fifteen grams per inch. The free length of the spring is selected to be about 2.25 inches. The spring and plunger assembly is held in support 34 by collar 63 and stylus 22 is secured to plunger 60 by means of a set screw (not shown) or the like. When a new stylus is inserted in holder 62, the spring is compressed to about 1.5 inches, giving a stylus pressure of about fourteen grams. The stylus wire may consequently wear down a full quarter of an inch or more before replacement is necessary. At this point, stylus pressure is still at least ten grams.

Holder 62, and with it the spring assembly and stylus, is placed in operating position through the action of follower 37 actuated by solenoid 64. When actuated, the solenoid pulls the follower to engagement with lead screw 24. Consequently, support 34 begins to travel the length of cylinder 23, the stylus support 62 is urged toward the cylinder, and marking takes place, e.g., by burning the paper around the cylinder as a result of the difference in potential of the energized stylus and the grounded cylinder. Smoke may be exhausted via chimney 38. At the end of scanning, solenoid 64 is released and by virtue of spring 65, follower 37 disengages lead screw 24 and retracts the stylus holder from the paper surface. Assembly 34 may then be returned to its initial position, either manually or by mechanical means, before the next spectrogram is prepared.

Turning now to the electrical interconnection of the various elements which turn the several features of the invention to account, FIGS. 4 and 5, interconnected as shown in FIG. 6, together comprise a block schematic diagram of the overall system. After the desired portion of pre-recorded tape 101 has been placed on drum 17, switch 102, preferably available on or near front panel 100 of the apparatus, is closed to apply a potential to clamp-tension solenoid 40. As described above, this action is effective to lock the desired loop of tape tightly about drum 17 so that analysis may take place. Thereupon, analysis switch 103, likewise available on or near panel 100, is closed supplying a potential to stylus solenoid 64, thus to engage stylus linkage 37 with lead screw 24 and, consequently, stylus 22 with the writing surface of cylinder 23. Switch 103 also energizes coupler 104 which applies the rotational motion of motor 105 to cylinder 23, lead screw 24 and transducer 25 within drum 17. By utilizing selector 104 as a control, the motor may be brought to the correct operating speed in advance. A belt, chain, or gear arrangement 106 or the like, may be used to drive the several elements.

With a 12-to-1 speed-up ratio, transducer 25 converts signals recorded on the length of magnetic tape 101 surrounding drum 17, which typically occupies the frequency band of 50 cycles through 7 kilocycles per second, to electrical signal representations in the range of 600 cycles through 84 kilocycles per second. These signals are passed through amplifier 107 and, if desired, through an attenuator 108 so that the amplitudes of the signals may be precisely controlled. The signals are then supplied by way of summing amplifier 109 to a first modulator 110. The other input to modulator 110 comprises signals generated in a voltage controlled oscillator 111, whose primary control is obtained from a rheostat 133 connected between a source of positive potential and a reference potential, e.g., ground. Rheostat 133 is continuously adjusted in value in synchronism with the movements of the stylus assembly. A mechanically driven helical potentiometer has been found to be satisfactory. The frequency of the voltage developed by oscillator 111 is thus proportional to the momentary position of the stylus on cylinder 23. At the initial point of contact of the stylus with the cylinder, normally at the left or downward portion of the cylinder as viewed in FIG. 4, oscillator 111 develops signals at the lowest frequency of its range, e.g., 126 kilocycles per second. As the stylus assembly traverses the length of cylinder 23, the frequency of generated signals gradually increase to a maximum value, e.g., 210 kilocycles.

The sweeping frequency of oscillator 111 is supplied to modulator 110, there to form the usual modulation products with signals from transducer 25. These products are supplied to bandpass filter 112, which is tuned to a fixed frequency, for example, of 126 kilocycles per second with a bandwidth of approximately 5 kilocycles. Accordingly, as the frequency of oscillator 111 is swept from 126 kilocycles to 210 kilocycles, filter 112 selects the product which is always the difference between the oscillator value and the input signal value. In well known fashion, a 5 kilocycle band of signals is supplied to buffer amplifier 113 in precise correspondence to the position of stylus 22 on the recording cylinder.

To aid further in processing, the signals are supplied to a second modulator 114 wherein they are mixed with signals emanating from oscillator 115. This oscillator is adjusted to a frequency of, for example, 96 kilocycles per second. It provides signals at that frequency and, by way of a suitable dividing network, at a frequency of 12 kilocycles per second. The 96 kc. signal output is utilized in modulator 114. The products of the modulator are supplied to bandpass filter 116 which is tuned to a nominal frequency of 30 kilocycles per second and has a bandwidth, for example, of 3.6 kc. By this second modulation step, a filtered portion of the signal is shifted down to a lower frequency to permit conventional voice frequency circuits to be used. Because of the 12-to-1 speed-up ratio of playback, all frequencies of the signal are multiplied by 12. Therefore, the effective bandwidths of the analyzing filters 116 and 123 are 3600/12 and 600/12, respectively. By this expedient, analysis takes place at a considerably faster rate, that of the scanning ratio, than permissible without the speed up, but with no additional circuit demands.

The fixed frequency output of filter 116 is supplied both to buffer amplifier 117, which provides signal isolation, and to one pole, 118, of a solenoid operated switch. Signals passed through amplifier 117 are supplied to narrow band filter 123, which has a nominal center frequency of 30 kc. but a bandwidth of, for example, 600 cycles per second. The narrow band signals are supplied to pole 119 of the switch. Accordingly, signals from filter 116 may be supplied either directly by way of pole 118 or by way of the amplifier-filter path and pole 119 to detector 121 dependent on the position of wiper arm 120. The selection between the two may be made manually by means of switch 124 or by automatic means, to be described hereinafter. In either case, relay coil 125 is energized to actuate wiper 120. Experience has shown that a wide band signal, e.g., from filter 116, is preferable for averaging speech components for emphasizing resonance positions. A narrow band signal, e.g., one passed through filter 123, is preferable for separating the individual frequency components.

Detector 121 may be a rectifier or the like of any desired sort capable of handling 30 kc. signals. Preferably, it should have a linear range of at least 50 db. Baseband signals derived from the detector are supplied to the wiper arm of switch $127_1$. Three possible paths may be selected for three alternative processing modes. The first is by way of pole *a* of the switch through low-pass filter 128, and by way of pole *a* of switch $127_2$ to one input of modulator 134. Switches, $127_1$, $127_2$, and $127_3$ are ordinarily manually controllable and operate in synchronism. By virtue of the low-pass characteristic of filter 128, typically 5 kc., the 30 kc. carrier is removed but frequency components in the envelope of signals emanating from filters 116 or 123 are unaltered and allowed to pass. Modulator 134 is also supplied with the 12 kilocycle marking signals from oscillator 115, previously discussed. The output of the modulator is thus a 12 kc. signal with amplitude variations proportional to a sweeping narrow band of signals from detector 121. After passage through marking amplifier 135, which raises the intensity of the modulated signals to one suitable for marking, 400 volts in one typical example, the signal is supplied to stylus 22. With the stylus at this potential and cylinder 23 maintained at reference signal level, e.g., ground, marking takes place and a full band spectrogram is produced.

The second alternative path for signals developed in detector 121 is by way of poles *b* of switches $127_1$, $127_2$, and $127_3$. In this position signals are supplied directly to amplitude sampler 130. Sampler 130 is actuated for a brief interval once each revolution of cylinder 23. This action is initiated conveniently by switch 136 which is actuated by a pin or the like carried by one of the holes 33 at the edge of the cylinder. For example, the pin may momentarily apply ground potential to the sampler input. A relay or the like may be used in the connecting circuit, if desired. Hence, for each revolution of the cylinder, the switch is momentarily closed to actuate the sampler which, in turn, supplies a brief signal at its output. Preferably, the sampler includes a level sensing element which establishes a signal threshold. Applied signals below the threshold result in no sample output; signals above the threshold produce an output. In practice, it has been found convenient to employ a conventional sampler in conjunction with a shunt RC network 131 connected in the output of the sampler circuit and an auxiliary threshold device. Signal samples instantaneously charge the capacitor which then discharges at a rate determined by the RC constant. The decaying signal sample from network 131 is supplied by way of pole *b* of switch $127_3$ to the input of quantizer apparatus 132. Whenever the charge on the capacitor in network 131 is above the established threshold, a binary signal is emitted from the quantizer via a terminal *b* connected to the lowest step of the quantizer output only which is connected to pole *b* of switch $127_2$. Although a separate threshold network may be employed, in practice the lowest output level of quantizer 132 performs this function. This signal is supplied to the input of modulator 134 and is used for marking. In this fashion, a so-called "cross-section" spectrogram is produced.

The third alternative path for signals from detector 121 is by way of filter 129 and pole *c* of switch $127_3$ directly to quantizer 132. As before, low-pass filter 129, which typically has a cutoff characteristic in the neighborhood of 600 cycles per second, averages the envelope characteristic of the detected signals from detector 121 and removes all high frequency carrier components. Quantizer 132 restricts the instantaneous amplitude of samples to one of a selected number of discrete levels. Any quantizing apparatus well known in the art may be utilized for this purpose. The number of quantizing steps may be selected as desired to yield any degree of granularity. If a great number of steps, e.g., 128, are selected, a virtually "nongranular" appearance is achieved. If a lesser number of steps, e.g., 8, are selected, a coarse and rather stylized display results. Quantized signals are then connected by way of pole *c* of switch $127_2$ to modulator 134 and thence to the marking amplifier and sytlus. As a result, a so-called "contour spectrogram," is produced.

To provide calibrating marks directly on the spectrogram, a second pin (or the same pin used to energize switch 136) carried at the periphery of cylinder 23 is used to actuate switch 137 which triggers calibration timing apparatus 138. For each revolution of the cylinder, a signal pulse is thereby developed by timer 138 and supplied by way of gate 139, to summing amplifier 109. Gate 139 permits passage of calibrating signals only when energized by signals, at a 12 kc. rate, from oscillator 115. As previously mentioned, addition of the calibration pulses at this point, ahead of the scanning filters, simplifies the calibration operation by assuring that the harmonic of the calibration signal correctly related to the tape signal is passed to the stylus. Further, since the calibrating signal occurs at a 12 kilocycle rate, and since playback takes place at 12 times the normal rate, 12 kc. harmonics actually show the position of 1 kc. harmonics on the spectrogram print.

At the conclusion of the analysis process, e.g., when the stylus assembly has reached the end of travel on lead screw 24, and consequently the end of cylinder 23, a switch (not shown) may be engaged automatically. This removes the potential supplied by way of switch 103 to stylus solenoid 64 and to speed selector 104. The analysis operation is thereupon terminated. Ordinarily, a suitable interconnection between the analysis circuit, i.e., switch 103, may be made so that clamp switch 102 is held closed during the analysis period but is released at the conclusion of analysis. Alternatively, clamp switch 102 may be held closed after the conclusion of analysis and released manually when desired.

If it is desired to continue with an analysis of the next contiguous portion of material recorded on tape 101, it is in accordance with the invention to advance the tape automatically to the precise position that will assure contiguity of analysis. This is accomplished by means of timing apparatus 140, which may include for example a monostable multivibrator. Typically the multivibrator has an "on" period precisely equivalent to the corresponding signal interval of drum 17 available for analysis during any one scanning operation. In one embodiment of the invention, the interval is approximately 2.3 seconds. The multivibrator is actuated by way of switch 141 which, as switches 102 and 103, is conveniently located on or near panel 100. When closed, switch 141 supplies suitable potential to timer 140 to cause it to generate on 2.3 second signal pulse. This pulse actuates relay 142, or the like, which opens switch 143 in the clamp circuit, thereby releasing clamp solenoid 40. It also actuates solenoid 144 which, after the clamp is removed, urges idler 55 to engagement with drive capstan 56. Tape 101 is then pulled forward around drum 17. At the end of the prescribed advance period, e.g. 2.3 seconds in this example, solenoid 144 is released, idler 55 is retracted, i.e., moved away from the drive capstan, and switch 143 is again closed so that clamp solenoid 40 locks the tape about drum 17. As soon as the recording paper about cylinder 23 has been replaced and the stylus assembly returned to its beginning position, analysis switch 103 may again be actuated. In dependence on the position of switches 127 and 124, a spectrogram will be produced which represents the spectral distribution of energy in the signal portion contiguous to that previously prepared.

It will be apparent to those skilled in the art that various other circuit configurations for accomplishing the several features of the present invention may be employed. Thus, the particular modulator arrangement for reducing the frequency range of signals to a nominal 30 kilocycles is a matter of choice. Other frequencies may be selected and the second modulator may be eliminated entirely. It has been found, however, that the arrangement described above is a preferred one because it simplifies the construction of the several filters, the detector, sampler, and quantizer apparatus of the invention. Further, the compromise of frequencies and scanning speed assures a relatively high speed of spectrogram preparation with precise marking and precise control of the several circuit elements. Other modifications and improvements will occur to those skilled in the art without, however, departing from the spirit and scope of the invention.

What is claimed is:

1. Sound spectrograph apparatus which comprises, in combination, means for supporting a selected portion of a magnetic tape record bearing a message signal about a drum, means including a magnetic reproducer rotatably supported within said drum for repetitively reproducing said selected record portion, means for sequentially clamping said selected tape record in a fixed position about said drum, and for thereafter supplying sufficient tension said tape record to assure intimate contact of said tape about said drum during reproduction, means for developing a measure of signal amplitude in each of a plurality of narrow frequency bands in said selected record portion, one such measure being developed during each of said plurality of reproductions, means for displaying said measures of amplitude as a function of frequency and time, means including a stylus member responsive to said measures of amplitude for controllably engaging said display means with a preselected constant force, means for moving said stylus relative to said display means in synchronism with said repetitive reproductions of said selected record portions, means for sequentially releasing said tension and clamping means upon completion of said reproductions, and means for systematically advancing selected contiguous segments of said tape record for reproduction.

2. Apparatus for analyzing a message wave and displaying the several harmonic components thereof as a function of time, frequency, and amplitude which comprises, in combination, means for selecting for analysis a segment of a record bearing a message wave, means for clamping said selected record segment under tension in a fixed configuration thereby to isolate it from the remainder of said record, means for scanning said selected segment repeatedly to derive repetitive electrical signal representations thereof, means including a scanning filter and a detector for producing an indication of signal magnitude in relatively narrow frequency intervals in the spectrum of said message wave as said record segment is scanned, stylus means responsive to said indications for successively marking a display medium in proportion thereto synchronously with said scanning, means for controllably engaging said stylus means continuously with said medium with a preselected relatively constant force, and means for advancing said record a preselected interval at the conclusion of said scanning.

3. Apparatus as defined in claim 2 wherein said means for clamping said selected record segment under tension in a fixed configuration comprises, at least two fixed idlers for supporting said record in said fixed configuration, a solenoid, means for controllably energizing said solenoid, first linkage means supporting at least two separated clamp members, said first linkage means being operatively responsive to actuation of said solenoid for respectively urging said clamp members individually against said fixed idlers thereby to immobilize a record portion passed therebetween, second linkage means including a tensioning idler at one extremity thereof for urging said tensioning idler against that portion of said record immobilized between said clamp members, said second linkage being operatively responsive to actuation of said solenoid, and means associated with said first and said second linkages for delaying the operation of said second linkage until operation of said first linkage is complete.

4. Apparatus as defined in claim 2 wherein said means for controllably engaging said stylus means continuously with said medium with a preselected constant force comprises, a tubular support, a member slidably positioned within said support at one end thereof for carrying said stylus in juxtaposition to said medium, a compression spring positioned within said support, said spring having a constant not greater than fifteen grams per inch and a free lngth of not less than two inches, means positioned within said support at the other end thereof for urging said spring against said stylus carrying member, whereby a relatively constant pressure of said stylus against said medium is maintained substantially constant over a relatively large range of axial stylus position.

5. Apparatus as defined in claim 3 wherein said means for advancing said record a preselected interval at the conclusion of said scanning comprises, a monostable device having a time-constant substantially equal to said preselected interval for producing a control signal which persists for said preselected interval, means responsive to an applied signal for actuating said monostable device, means responsive to said control signal for de-energizing said means for clamping said selected record segment under tension for the duration of said preselected interval and for again clamping said record segment under tension at the cessation of said control signal, and means responsive to said control signal for continuously advancing said record at a prescribed rate during said preselected interval.

6. In combination with apparatus for analyzing the spectrum of a message wave which includes means for transporting a magnetic tape bearing a recorded message signal from a first storage location to a second storage location, and means intermediate said first and said second storage locations including a generally circular auxiliary path for supporting said magnetic tape for repetitive playback, means for isolating that portion of said tape supported in said auxiliary path from said storage locations and for tautly securing said tape in said auxiliary path which comprises: a first idler for guiding said tape from said first storage location to said auxiliary path, a second idler for guiding said tape from said auxiliary path to said second storage location, first clamping means for engaging said first idler, second clamping means for engaging said second idler, first means responsive to an applied control signal for simultaneously bringing said first and said second clamping means into engagement with said respective idlers, a third idler carried by a movable member in proximity to said tape within said auxiliary path, second means responsive to said control signal for bringing said third idler into engagement with said tape with a prescribed force and for maintaining said force so long as said control signal persists, and means operatively associated with said first and said second means responsive to said control signal for delaying the engagement of said third idler with said tape until said first and said second clamping means have engaged said first and said second idlers respectively.

7. In combination with a sound spectograph which includes a continuous path for magnetic tape bearing message signals for anlysis, said path including a circular guide for bringing a prescribed length of said tape into scanning relation with a rotating magnetic transducer, and means for controllably clamping said tape in said scanning relation, means for intermittently advancing said tape about said guide one prescribed length at a time which comprises: controllable means for moving said tape about said guide at a uniform rate, monostable means with a time-constant equal to the interval required for said moving means to advance said tape one of said prescribed lengths, means for actuating said monostable means, thereby to produce a control signal for the duration of said time-constant, means responsive to said control signal for releasing said controllable clamping means for the duration of said control signal, and means for actuating said controllable tape moving means for the duration of said control signal.

References Cited

UNITED STATES PATENTS

| | | | |
|---|---|---|---|
| 3,024,319 | 3/1962 | Roberts | 179—100.2 |
| 2,425,003 | 8/1947 | Potter | 179—1 |
| 2,429,229 | 10/1947 | Koenig | 179—1 |
| 2,442,561 | 6/1948 | Finch | 346—74 |
| 2,476,445 | 6/1949 | Lacy | 179—1 |

KATHLEEN H. CLAFFY, *Primary Examiner.*

R. P. TAYLOR, *Assistant Examiner.*